United States Patent [19]

Bakhle et al.

[11] Patent Number: 6,061,092
[45] Date of Patent: May 9, 2000

[54] METHOD AND APPARATUS FOR DARK FRAME CANCELLATION FOR CMOS SENSOR-BASED TETHERED VIDEO PERIPHERALS

[75] Inventors: Ashutosh J. Bakhle; Bradley C. Aldrich, both of Chandler, Ariz.

[73] Assignee: Intel Corporation, Santa Clara, Calif.

[21] Appl. No.: 08/985,575

[22] Filed: Dec. 5, 1997

[51] Int. Cl.[7] .................................................. H04N 9/64
[52] U.S. Cl. ........................................................... 348/243
[58] Field of Search ...................................... 348/243, 552, 348/245, 246, 247, 241, 362, 364, 308, 301, 231, 232; 250/208.1; 358/461, 444, 403, 523, 529

[56] References Cited

U.S. PATENT DOCUMENTS

| | | | |
|---|---|---|---|
| 5,047,863 | 9/1991 | Pape et al. | 348/243 |
| 5,132,801 | 7/1992 | Yamano | 348/245 |
| 5,272,536 | 12/1993 | Sudo et al. | 348/243 |
| 5,365,269 | 11/1994 | Holmes et al. . | |
| 5,479,206 | 12/1995 | Ueno et al. | 348/552 |
| 5,541,654 | 7/1996 | Roberts | 348/301 |
| 5,568,192 | 10/1996 | Hannah | 348/552 |
| 5,602,984 | 2/1997 | Mieras | 395/501 |
| 5,608,455 | 3/1997 | Oda | 348/243 |
| 5,612,739 | 3/1997 | Maki et al. | 348/243 |
| 5,642,162 | 6/1997 | Maki et al. | 348/243 |
| 5,696,554 | 12/1997 | Hwang | 348/246 |
| 5,729,288 | 3/1998 | Saito | 348/243 |
| 5,734,425 | 3/1998 | Takizawa et al. | 348/552 |
| 5,796,430 | 8/1998 | Katoh et al. | 348/243 |
| 5,805,300 | 9/1998 | Fukushima | 348/243 |
| 5,812,703 | 9/1998 | Juen et al. | 348/243 |
| 5,926,214 | 7/1999 | Denyer et al. | 348/243 |

OTHER PUBLICATIONS

Hurwitz et al., "An 800K–Pixel Color CMOS Sensor for Consumer Still Cameras," SPIE 17 Nov. 1997; vol. 3019, pp. 115–124.

Primary Examiner—Wendy Garber
Assistant Examiner—Aung S. Moe
Attorney, Agent, or Firm—Steven P. Skabrat

[57] ABSTRACT

Elimination of dark fixed pattern noise (DFPN) for tethered CMOS sensor-based digital video cameras is supported by supplying and maintaining a host-based dark image cache. Since the camera is tethered to a host computer system such as a PC, it takes advantage of the storage and processing capabilities of the host to manage the cache. By using a dark image cache for updating of the currently applicable dark image for DFPN cancellation processing, operation of the camera shutter for acquiring dark images is dramatically reduced, thereby using less system resources such as power, and increasing the MTBF of the electromechanical devices such as the camera shutter and associated controls. Dark images are obtained at different integration, gain, and temperature operating characteristics of the camera and stored in the cache. The cached dark images are referenced on the host according to a fixed, predetermined dark column of data in video frames generated by the CMOS sensor image array of the camera. The dark column data represents a portion of the CMOS sensor image array which is permanently and totally shadowed for use during DFPN cancellation processing.

27 Claims, 7 Drawing Sheets

METHOD AND APPARATUS FOR DARK FRAME CANCELLATION FOR CMOS SENSOR-BASED TETHERED VIDEO PERIPHERALS

BACKGROUND OF THE INVENTION

1. Field of the Invention

The present invention relates generally to digital video and still cameras and more specifically to improving the quality of images captured by a digital camera having CMOS image sensors.

2. Description of Related Art

Digital imaging sensors using complementary metal oxide semiconductor (CMOS) technology in video and still cameras are replacing imaging sensors using charge coupled devices (CCDs). When a CMOS sensor image array is exposed to light from a scene image, photons hit the image array and a charge is generated by each CMOS sensor in the image array. A portion of each charge is proportional to the photon rate from the scene image. A remaining portion of each charge is due to process inaccuracies which are manifested as a fixed pattern of noise in the image generated by the CMOS sensors. This noise degrades the quality of the sensed image.

Dark Fixed Pattern Noise (DFPN) is a result of photodiode leakage current sensed by the CMOS sensors. DFPN occurs even when there is no light reaching the CMOS sensors. Hence, it is a set of errors inherent in the CMOS sensor image array's operation. Some value of DFPN is added to the charge generated due to the scene image at each individual pixel of the CMOS sensor image array. The DFPN at each pixel varies significantly as a function of operating temperature, exposure parameters, and pixel location within the image array. It is highly desirable to remove the DFPN from the sensed image to improve the quality of the image.

Cancellation of DFPN is achieved by capturing a "dark image" in close time proximity to the sensing of a scene image. The dark image is captured when no light is reaching the CMOS sensor image array. The dark image is also captured with identical exposure parameters as the scene image. The dark image data is then subtracted from the sensed scene image data to produce corrected scene image data. The corrected scene image data has none of the image degradation due to DFPN which is normally prevalent in images obtained by CMOS sensors.

Figure 1A:
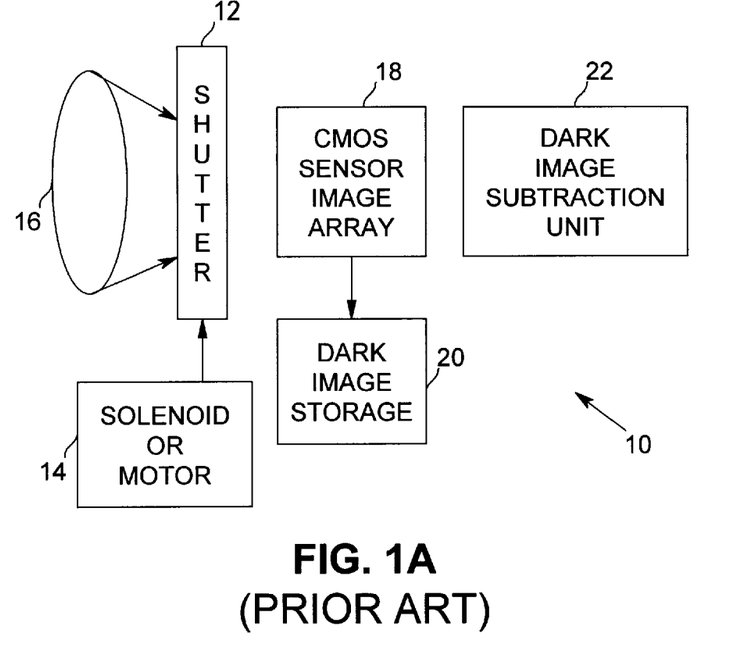
FIG. 1A is a diagram of a system for acquisition of a dark image (Prior Art).
Figure 1B:
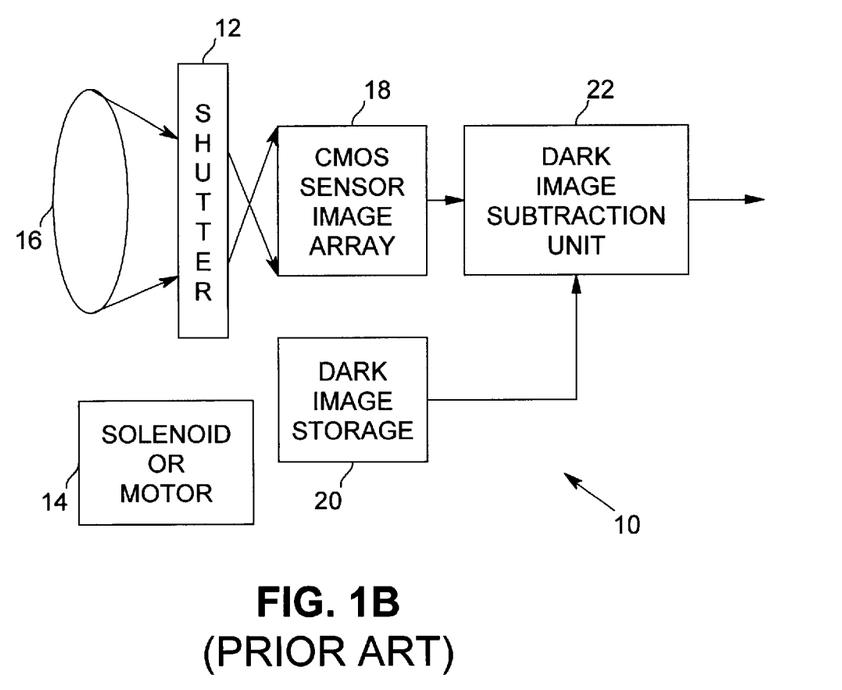
FIG. 1B is a diagram of a system for dark fixed pattern noise cancellation (Prior Art).

An electromechanical shutter is typically employed in the acquisition of a dark image for use in DFPN cancellation for both still as well as video modes of operation when using CMOS sensors as the image acquisition device. The principal of DFPN cancellation is illustrated in FIGS. 1A and 1B. FIG. 1A shows a digital camera system 10 having an electromechanical shutter 12 controlled by a solenoid or motor 14. In normal operation, a scene image 16 passes through the shutter to be processed by other components of the camera. However, for dark image acquisition, the shutter 12 is closed at the direction of solenoid or motor 14 so no light passes through to the other components. Since no light is allowed to reach the CMOS sensors, CMOS sensor image array 18 senses the charges inherent in the operation of the CMOS sensors according to the current operating characteristics and stores these charges as DFPN in dark image storage 20. Each sensor of the CMOS sensor image array 18 has its own value of DFPN. The data stored in the dark image storage 20 is an array of noise values for the pixels of the sensed image. FIG. 1B shows how the acquired DFPN data is used to correct a sensed scene image. While the shutter 12 is open, the scene image 16 is sensed by CMOS sensor image array 18. At this point, the sensed scene image data includes DFPN. A dark image subtraction unit 22 is included in the camera to reference dark image storage 20 to obtain the previously stored DFPN data, and to subtract the DFPN data from the sensed scene image data to produce corrected scene image data. The subtraction of the DFPN data from the sensed scene image data provides a significant improvement in the signal to noise ratio (SNR) of the resulting image. The corrected scene image data is passed to other components (not shown) for further processing such as display to a user or recording on a storage medium.

Since DFPN changes with environmental temperature and sensor settings, in video applications the shutter 12 needs to be used frequently in order to gather currently applicable dark images. The activity of operating the shutter increases the power consumption of the camera as well as decreases the mean time between failures (MTBF) for the shutter 12 and the solenoid or motor 14. Additionally, if the camera is coupled to a personal computer (PC) through a bus interface such as the Universal Serial Bus (USB), the increased power consumption required for frequent shutter operation in many cases will exceed the power limits imposed by the bus interface. When this occurs, the camera must supplement its power supplies with additional resources such as batteries or other high cost, low power electromechanical devices.

Of course, acquisition of dark images and cancellation of DFPN may be omitted in a CMOS sensor-based digital camera, but this may result in an unacceptable degradation of image quality.

A method of acquiring dark images and cancellation of DFPN that overcomes the disadvantages of the prior art would be desirable, especially for CMOS sensor-based digital cameras tethered to a PC.

SUMMARY OF THE INVENTION

An embodiment of the present invention is a method of controlling dark fixed pattern noise cancellation in a CMOS sensor-based camera. The method includes the steps of providing a cache of dark images, the dark images being indexed by a data structure, each entry in the data structure storing dark column reference data associated with one of the dark images; obtaining current dark column reference data from a dark column in a current video frame of a stream of video frames generated by the camera; comparing the current dark column reference data to entries in the data structure of dark column reference data; and using a dark image from the cache associated with an entry in the data structure of dark column reference data to perform dark fixed pattern noise cancellation processing on the stream of video frames when the current dark column reference data matches the entry.

Another embodiment of the present invention is an apparatus for controlling dark fixed pattern noise cancellation in a CMOS sensor-based camera. The apparatus includes a cache of dark images, the cache having a data structure indexing the dark images, each entry in the data structure storing dark column reference data associated with one of the dark images; circuitry for obtaining current dark column reference data from a dark column in a current video frame of a stream of video frames; and circuitry for performing dark fixed pattern noise cancellation processing on the current video frame using a selected dark image from the cache associated with an entry in the data structure when the current dark column reference data matches the entry.

BRIEF DESCRIPTION OF THE DRAWINGS

The features and advantages of the present invention will become apparent from the following detailed description of the present invention in which.

DETAILED DESCRIPTION OF THE PRESENT INVENTION

In the following description, various aspects of the present invention will be described. However, it will be apparent to those skilled in the art that the present invention may be practiced with only some or all aspects of the present invention. For purposes of explanation, specific numbers, materials and configurations are set forth in order to provide a thorough understanding of the present invention. However, it will also be apparent to one skilled in the art that the present invention may be practiced without the specific details. In other instances, well known features are omitted or simplified in order not to obscure the present invention.

The present invention is a robust methodology for the elimination of DFPN for tethered CMOS sensor-based digital video cameras. It is based on supplying and maintaining a host-based dark image cache. Since the camera is tethered to a host computer system such as a personal computer (PC), it can take advantage of the storage and processing capabilities of the host. By using a dark image cache for updating of the currently applicable dark image for DFPN cancellation processing, operation of the shutter for acquiring dark images is dramatically reduced, thereby using less system resources such as power, and increasing the MTBF of the electromechanical devices such as the shutter and the solenoid or motor. Furthermore, by using a dark image cache on the host, the decrease in power usage allows the camera to stay within a normal power budget for tethered operation through an interface such as a USB.

Figure 2:
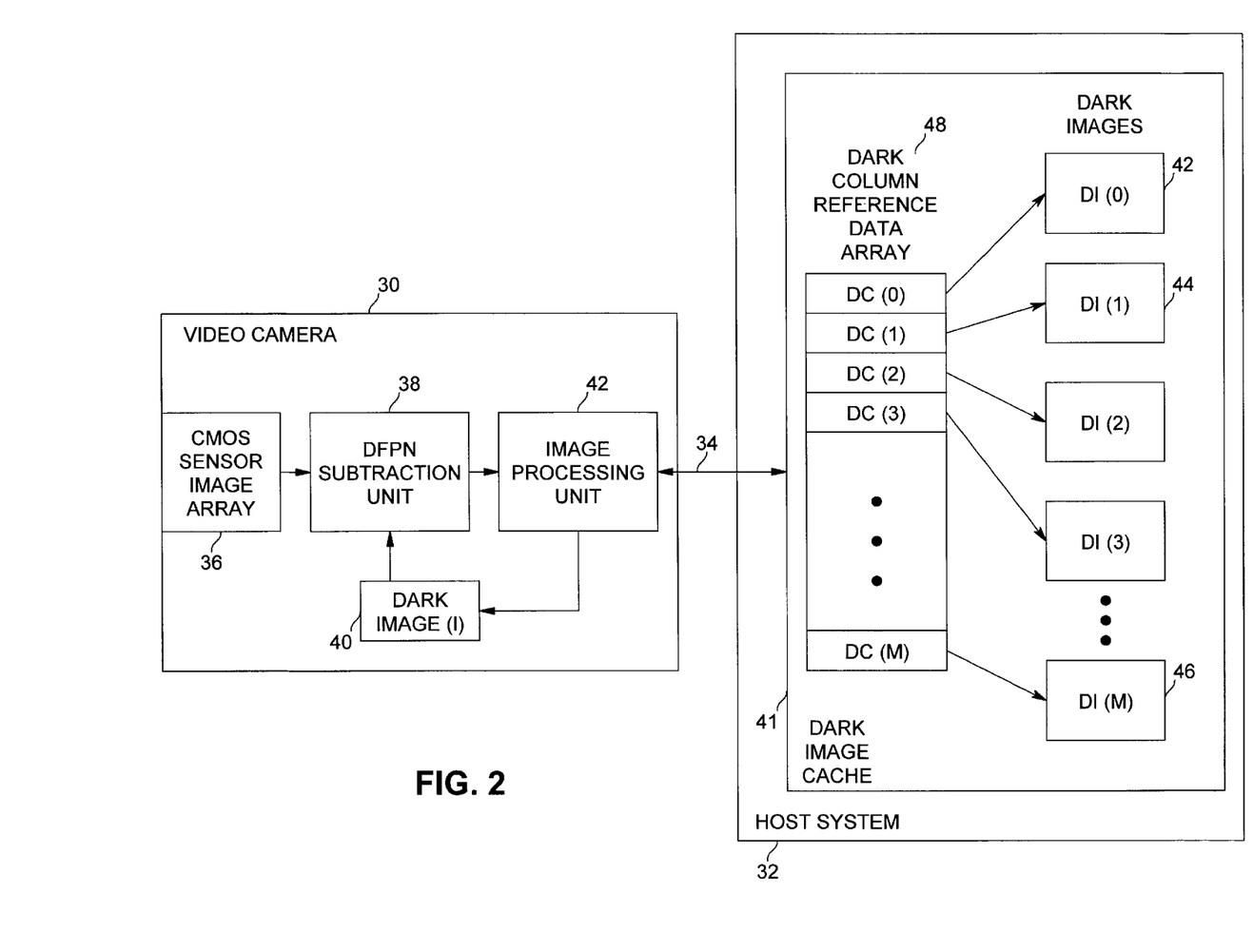
FIG. 2 is a diagram of a host-based dark image cache system according to the present invention.

Generally, a number of dark images are obtained at different integration, gain, and temperature operating characteristics of the camera and stored on a host computer system. The stored dark images are referenced on the host according to a fixed, predetermined dark column of data from the CMOS sensor image array. The dark column data represents a portion of the CMOS sensor image array which is permanently and totally shadowed for use during DFPN cancellation processing. FIG. 2 is a diagram of a host-based dark image cache system according to the present invention. A digital video camera 30 is tethered to a host system 32 by bi-directional interface 34. In one embodiment, the host system is a personal computer system based on the Intel Architecture (IA) instruction set architecture (ISA) and associated family of microprocessors available from Intel Corporation, Santa Clara, Calif., although other personal computers, workstations, set-top boxes and computer systems may also be used. The bi-directional interface in one embodiment is a Universal Serial Bus (USB), although other buses for interconnecting computer components and peripherals may also be used. Video camera 30 includes many components, of which only those relevant to the present invention are shown in FIG. 2. A CMOS sensor image array 36 generates sensed image data representing a scene image in the camera's environment. The sensed image inherently includes DFPN. The sensed image data is input to DFPN subtraction unit 38. The DFPN subtraction unit subtracts a currently applicable dark image (represented as dark image (I) 40 on FIG. 2) from the sensed image to create a corrected sensed image. Dark image (I) 40 is an array of DFPN values, each DFPN value representing an amount of distortion for a pixel in the sensed image. Image processing unit 42 controls the operation of DFPN subtraction unit 38 and the interface of the video camera 30 with the host system 32. DFPN subtraction unit 38 may be implemented as special purpose circuitry or in software or firmware executed by image processing unit 42. The DFPN cancellation operation is performed by DFPN subtraction unit according to methods well known in the art.

The host system 32 includes a dark image cache 41 stored in the host system's memory (not shown). Dark image cache 41 includes a plurality of dark images DI(0) 42, DI(1) 44, through DI(M) 46. Each dark image represents the DFPN for a particular set of operating characteristics of the video camera. The dark images are accessed via a dark column reference data array data structure 48. In one embodiment, dark column reference data is contained in an array of a fixed size corresponding to the maximum number of dark images stored on the host system, although other well known data structures and access techniques may also be used. Each entry in the dark column reference data array references an associated dark image and represents a signature of a particular operating environment of the camera. Software (not shown) operating on the host system manages the interaction between the video camera and the dark column reference data array and dark images.

When the video camera is initialized, a selected dark image from the dark image cache 41 is loaded into dark image (I) 40. This dark image (I) 40 is used for DFPN cancellation processing until the video camera 30 determines that the operating characteristics of the camera have changed enough to require a new dark image to be used. When a new dark image is to be used, dark column reference data array 48 is accessed to locate an entry matching the current operating characteristics. The current operating characteristics are identified by selected dark column reference data. When a match is found, the associated dark image is downloaded over bi-directional interface 34 to the video camera to become the new dark image (I) for DFPN cancellation processing. The matching operation uses data generated from an image under a dark column in the CMOS image sensor array 36 as a signature of the entire dark image. This signature is matched to entries in the dark column reference data array 48. The signature is obtained from one frame of a stream of video frames generated by the CMOS sensor image array 36.

Figure 3:
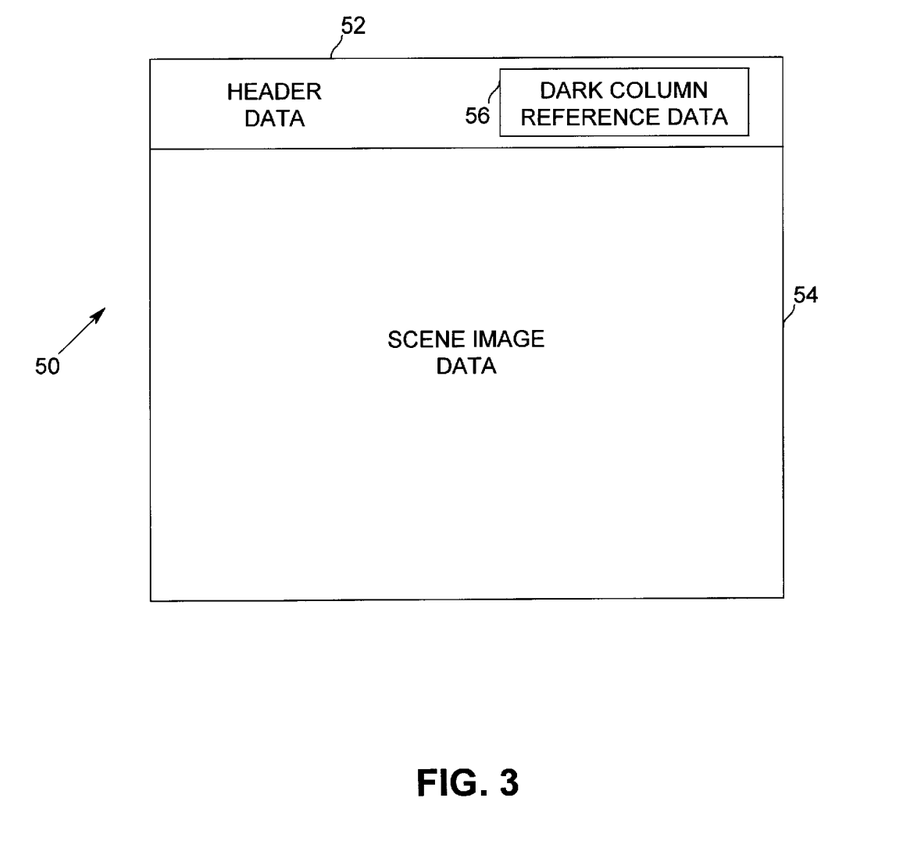
FIG. 3 is a diagram of a frame of video data according to the present invention.

The video stream generated by the successive operation of the CMOS sensor image array consists of a number of frames where each frame is immediately preceded by a header. Dark column reference data is included in each header and is monitored by the image processing unit 42 to determine if the operating conditions under which the current sensed image data is being acquired have changed. If the dark column reference data has changed significantly (such as more than a predetermined threshold amount), this indicates that the operating environment has changed and a new dark image may be required for DFPN cancellation processing. FIG. 3 is a diagram of a frame of video data according to the present invention. A frame includes header data 52 and scene image data 54. The scene image data represents the scene captured by the camera at a particular instant in time. The header data includes various control information relating to the frame and its place in the video stream. Header data 52 also includes dark column reference data 56. Each unique set of dark column reference data 56 (up to a maximum number of dark column reference data sets) is stored in the dark column reference data array 48 on the host system 32. As different dark column reference data sets are occurring in the frames of the video stream, the system detects changes in the dark column reference data represented in the frames and matches the dark column reference data in the frames to dark column reference data in the dark column reference data array 48 on the host.

Figure 4A:
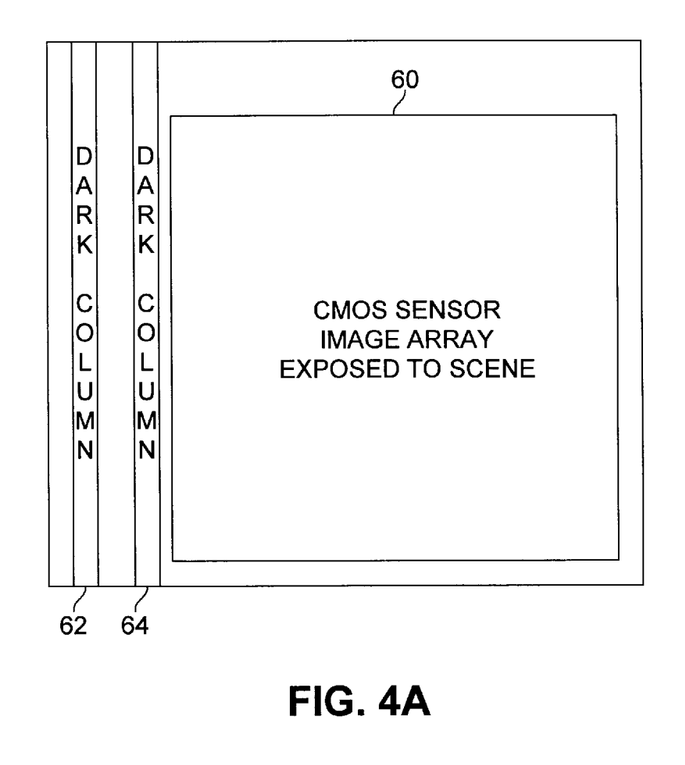
FIG. 4A and FIG. 4B are diagrams of CMOS sensor image arrays illustrating dark column reference data.
Figure 4B:
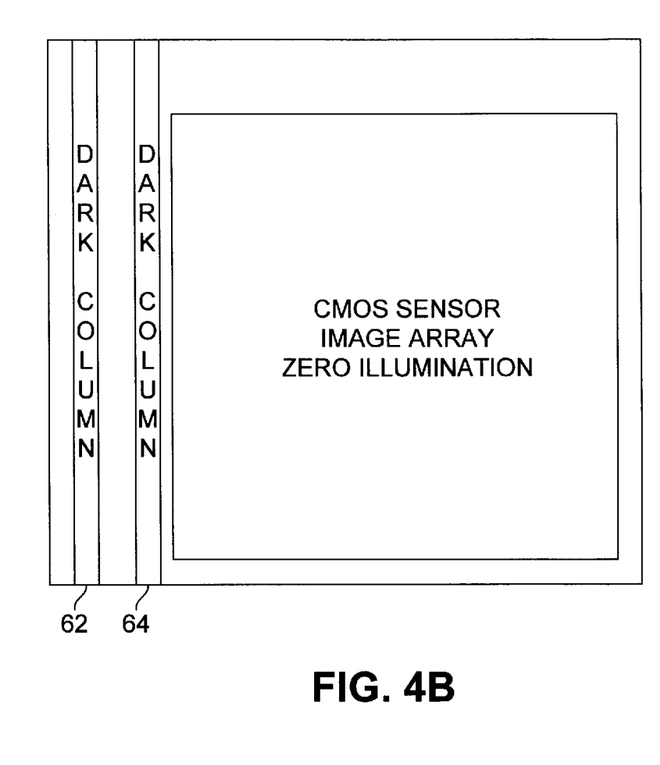

FIG. 4A and FIG. 4B are diagrams of CMOS sensor image arrays illustrating dark column reference data. The active area of the image array is shuttered for dark image acquisition and exposed for scene image acquisition. In both cases, the resulting images contain dark column reference data which provide the signature relating the images to each other. FIG. 4A shows a CMOS sensor image array wherein a portion 60 of the image array is exposed to a scene. CMOS sensors comprising two vertical strips in the image array 62, 64 are never exposed to light from the scene, but instead are always kept dark, thereby providing dark column reference data. The dark column reference data operate as the signature of the current operating environment. FIG. 4B shows a CMOS sensor image array when zero illumination is being received, such as when the shutter is closed. Note that in this case, the dark column reference data is still accessible. Since identical operating environments are used to capture data in both cases, the dark column reference data can be used to identify the dark image.

The use of a host-based dark image cache eliminates the requirement of frequently obtaining a new dark image through operation of the shutter. Instead, it requires that a dark image be captured only when the exposure parameters or environment change significantly and a corresponding dark image is not located in the dark image cache on the host system. In effect, the present invention enables the camera system to manage a memory of the operating environment it experiences for future use. Once the dark image cache has been established, the video camera will not require a new dark image to be captured unless the environment and/or exposure parameters rise above a predetermined threshold of change from the parameters of all stored dark images.

Figure 5:
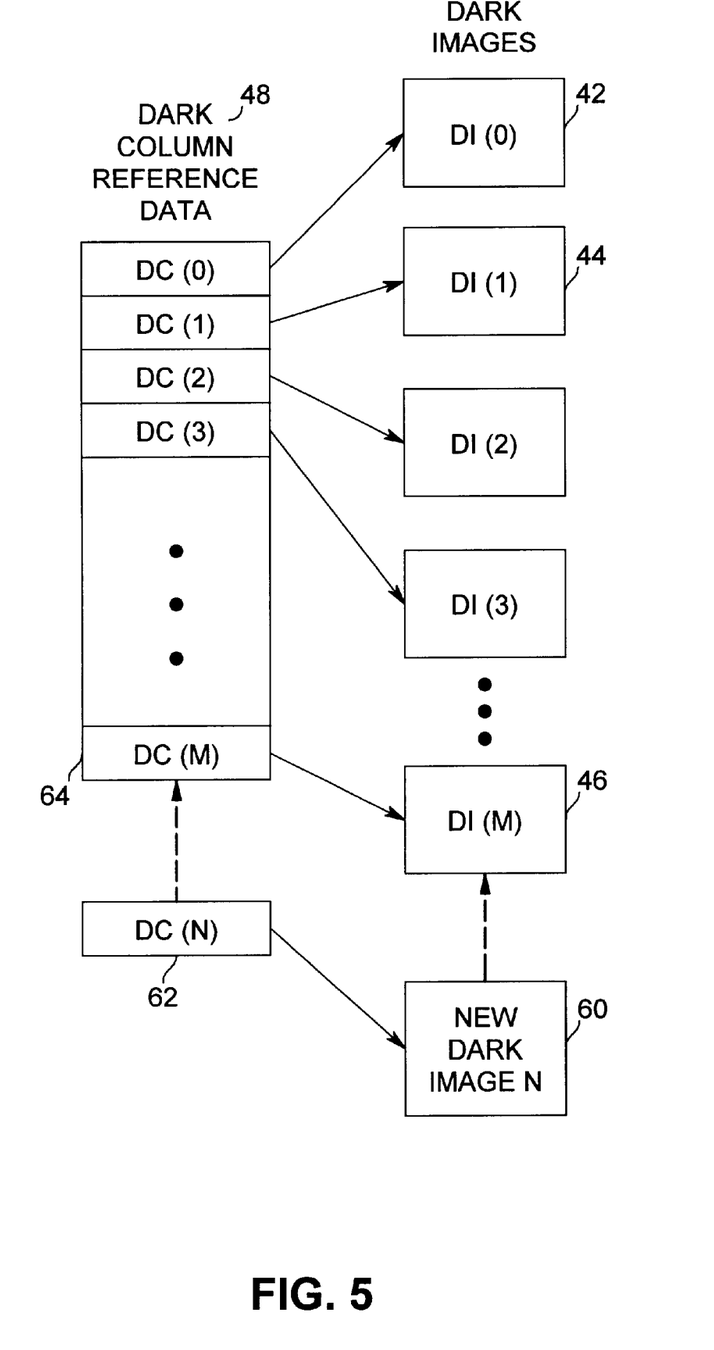
FIG. 5 illustrates replacement of dark images in the dark image cache.

In one embodiment, the dark images in the dark image cache are ranked based on the frequency of use. The least frequently accessed dark image is deleted from the dark image cache in favor of a new dark image when the dark image cache is full and a new dark image is acquired. FIG. 5 illustrates replacement of dark images in the dark image cache. Dark images DI(0) 42 through DI(M) 46 and the corresponding dark column data array 48 entries are ranked in order of increasing frequency of utilization. The least frequently used dark image DI(M) 46 is deleted from the host system's memory and the dark column reference data array is updated. A new dark image N 60 is stored in the host system's memory and a new dark column reference data array entry DC(N) 62 replaces DC(M) 64 in the dark column reference data array. In this embodiment, a least recently used (LRU) algorithm is used to determine which dark image is replaced, however, other alternative caching algorithms could also be employed.

Figure 6:
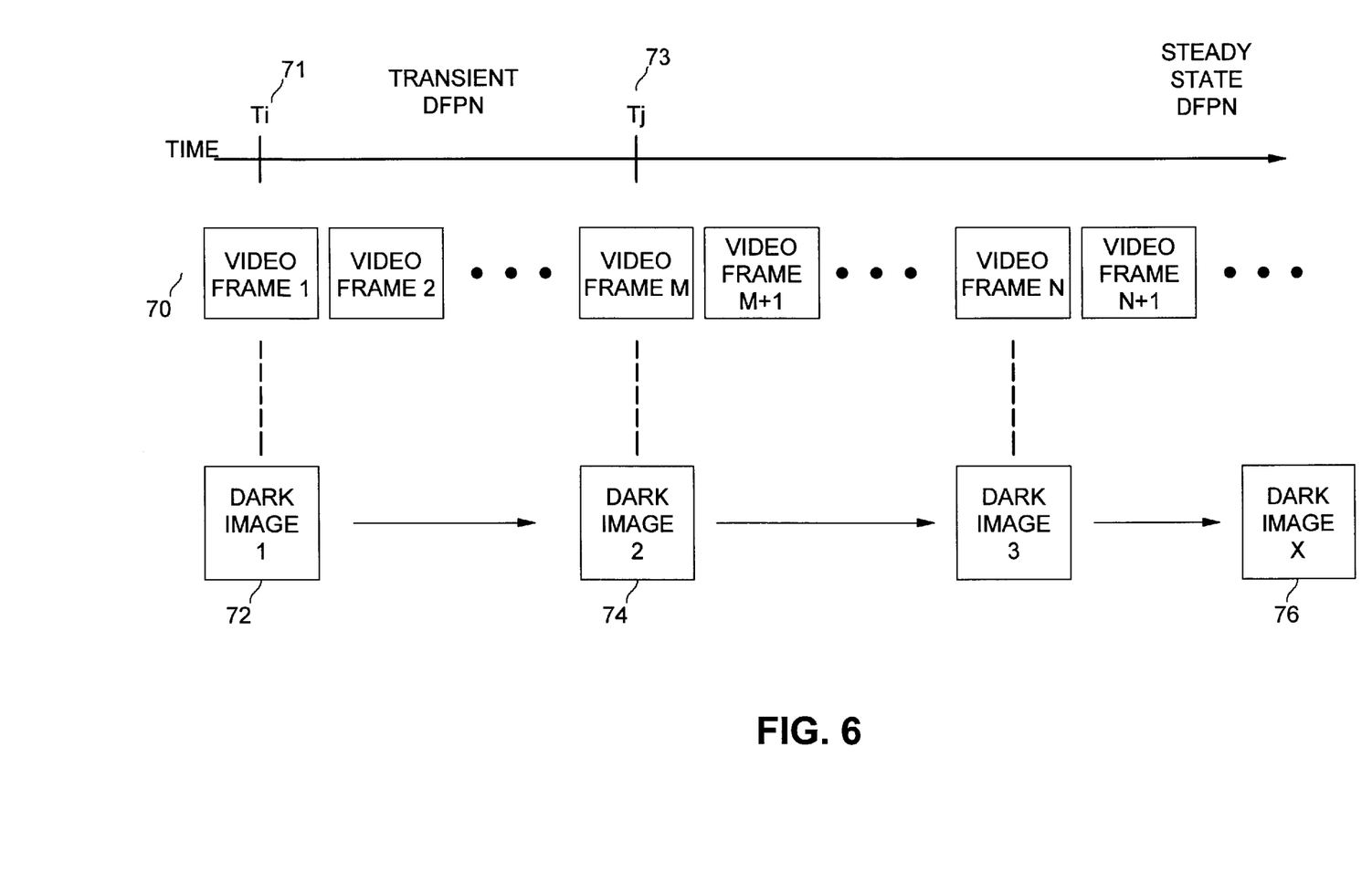
FIG. 6 is a diagram of the periodic acquisition of dark images during system initialization.

By providing a number of dark images in the dark image cache, the camera system is given a "memory" of operating conditions. A method is employed to initialize the dark image cache of the camera system following installation. The initialization state is different from steady state operation of the camera system since the dark image cache initially has no dark images. During the installation phase, the system creates the dark image cache, beginning with the first power-up of the camera. Each time an exposure change occurs, a new dark image is transferred to the dark image cache on the host system until the cache is full. Thereafter, a cache replacement algorithm such as is described above is used to manage changes to the dark image cache. During installation, a series of dark images is captured at periodic intervals after system initialization. FIG. 6 is a diagram of the periodic acquisition of dark images during system initialization. At start time, a series of video frames 70 are produced by the video camera at a predetermined video frame rate. As soon as the first video frames are produced at time Ti 71, a first dark image 72 is captured by the video camera and stored in the dark image cache on the host system. At some later point in time Tj 73, when a change in operating characteristics is detected by examination of the dark column reference data in the headers of the video frames, a new dark image 74 is acquired. This process continues until the dark image cache is full and steady state operation is achieved using dark image X 76.

Figure 7:
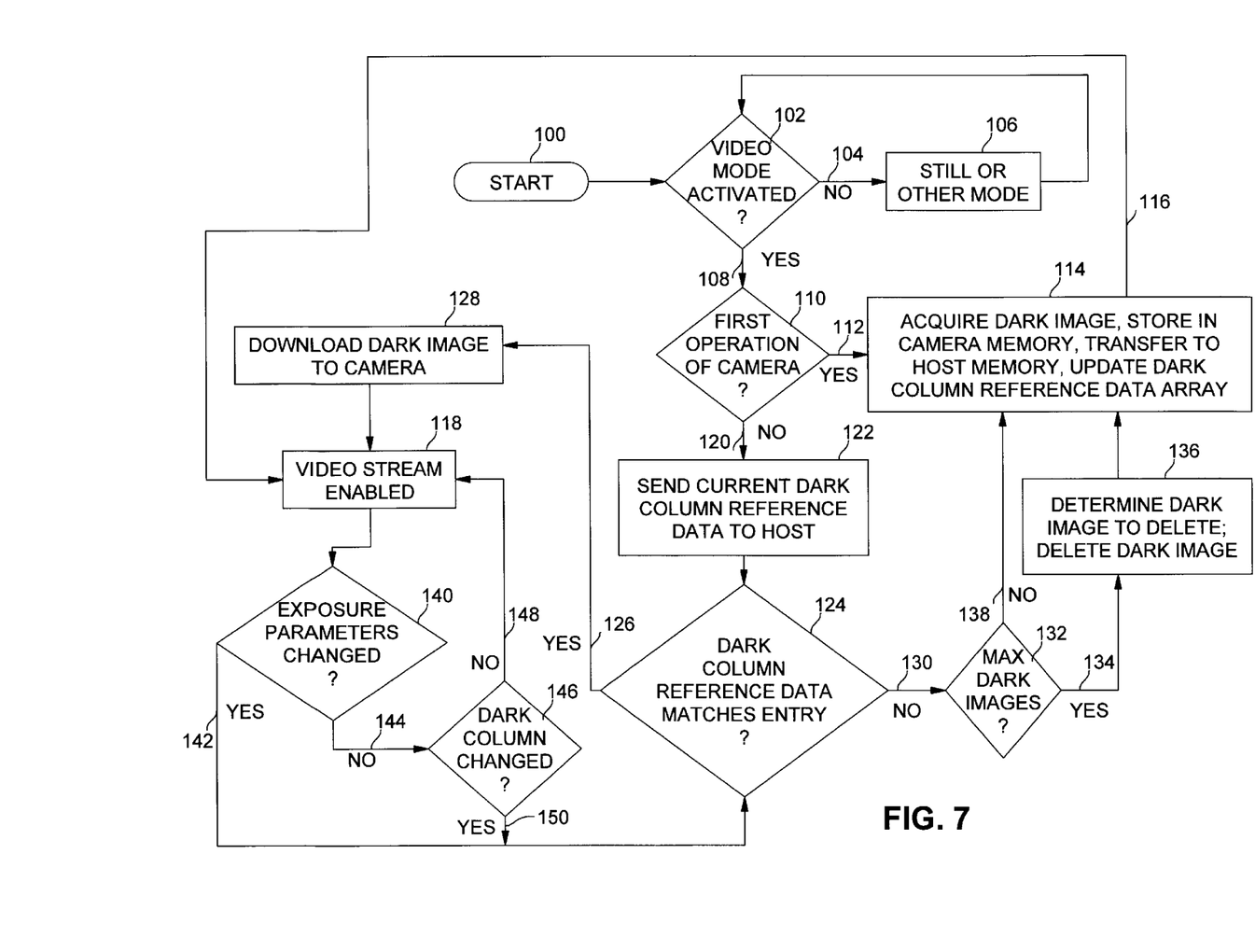
FIG. 7 is a flow diagram of the steps for managing the dark image cache of the present invention.

FIG. 7 is a flow diagram of the steps for managing the dark image cache of the present invention. After start step 100, the mode of operation of the camera is checked to determine if video mode is activated at step 102. If video mode is not activated, then No path 104 is taken to step 106, wherein a still or other mode of operation of the camera is processed. Otherwise, Yes path 108 is taken to step 110. If this is the first operation of the camera at step 110, then Yes path 112 is taken to Step 114. At this step, a dark image is acquired, stored in a memory within the camera, and also transferred to memory on the host system. The dark column reference data array is updated to reflect the presence of the new dark image. Processing then continues via path 116 with step 118, where the video stream for the camera is enabled. If this is not the first operation of the camera at step 110, then No path 120 is taken to step 122. At this step, the current dark column reference data from the current video frame is sent from the camera to the host system. If the dark column reference data matches an entry in the dark column reference data array at step 124, Yes path 126 is taken to step 128. At step 128 the dark image in the dark image cache on the host system corresponding to the matching dark column reference data array entry is downloaded over the bi-directional interface to the dark image(I) storage unit in the camera.

If the dark column reference data does not match any entry in the dark column reference data array at step 124, No path 130 is taken to step 132. If the maximum number of dark images is already stored in the dark image cache, then Yes path 134 is taken to step 136, where a least frequently used dark image is determined and this dark image is deleted. Processing then continues at step 114 with the acquisition of a new dark image. Otherwise, the dark image cache is not full, so processing proceeds directly along No path 138 to step 114 for the acquisition of a new dark image.

Once the video stream is enabled in the camera at step 118, the camera system periodically checks at step 140 to determine if any exposure parameters have changed. If a change is detected, then Yes path 142 is taken to step 124, where the current dark column reference data from the current video frame header is matched to entries in the dark column reference data array. Otherwise, if no change in exposure parameters is detected, No path 144 is taken to step 146. At this step, the current dark column reference data is checked to determine if it has changed more than a predetermined threshold amount from previously examined dark column reference data. If no change is detected, processing continues via No path 148 with step 118. Otherwise, a significant change has occurred. Thus, Yes path 150 is taken to step 124, where the current dark column reference data is matched to entries in the dark column reference data array.

In an alternate embodiment, the dark image cache is included in the video camera instead of the host system if the memory and processing resources of the video camera supports the storage and manipulation of multiple dark images.

The periodic application of the electromechanical device to shutter the CMOS sensor when operating in the video mode influences the power budget for the camera as well as the MTBF of the electromechanical device. The present invention's host-based dark image cache supports relaxation of the power budget and improvement in the MTBF by minimizing the need to use the shutter for dark image acquisition, while continuing to support optimal image quality through DFPN cancellation.

While this invention has been described with reference to illustrative embodiments, this description is not intended to be construed in a limiting sense. Various modifications of the illustrative embodiments, as well as other embodiments of the invention, which are apparent to persons skilled in the art to which the inventions pertains are deemed to lie within the spirit and scope of the invention.

What is claimed is:

1. A method of selecting dark images used in dark fixed pattern noise cancellation processing in a CMOS sensor-based, digital imaging system based on current operating characteristics of the CMOS sensor comprising:

providing a cache of dark images, the dark images being indexed by a data structure, each entry in the data structure storing dark image reference data associated with one of the dark images, each dark image corresponding to a set of operating characteristics of the CMOS sensor;

obtaining current dark image reference data from at least one dark area in a current frame of a stream of frames generated by the digital imaging system, the at least one dark area being a portion of the CMOS sensor receiving no illumination and operating as a signature of the current operating characteristics of the CMOS sensor;

comparing the current dark image reference data obtained from the dark area of the current frame to at least one entry in the data structure of dark image reference data; and using a dark image from the cache associated with an entry in the data structure of dark image reference data to perform dark fixed pattern noise cancellation processing on the stream of frames when the current dark image reference data corresponds to the entry.

2. The method of claim 1 wherein the cache is stored on a host computer system and the imaging system is a video camera coupled to the host computer system.

3. The method of claim 2, further comprising downloading the dark image from the host computer system to the video camera.

4. The method of claim 2, further comprising sending the current dark image reference data from the video camera to the host computer system.

5. The method of claim 1, further comprising enabling generation of the stream of frames.

6. The method of claim 1, wherein the comparing step further comprises comparing the current dark image reference data to at least one entry in the data structure of dark image reference data only when operating characteristics of the CMOS sensor have changed.

7. The method of claim 1, wherein the comparing step further comprises comparing the current dark image reference data to entries in the data structure of dark image reference data only when the current dark image reference data is different than immediately preceding dark image reference data.

8. The method of claim 7, wherein the difference between the current dark image reference data and the immediately preceding dark image reference data is greater than a threshold amount.

9. The method of claim 1, wherein the providing step comprises:

acquiring a new dark image from the CMOS sensor;

storing the new dark image in the cache; and updating the data structure of dark image reference data by adding a new entry associated with the new dark image, the new entry containing dark image reference data associated with the new dark image;

wherein the acquiring, storing, and updating are performed when the current dark image reference data signifying the current operating characteristics of the CMOS sensor does not correspond with any entries in the data structure of dark image reference data.

10. The method of claim 9, further comprising transferring the new dark image from the imaging system to a host computer system.

11. The method of claim 9, further comprising deleting an existing dark image in the cache before storing the new dark image when the cache is full.

12. An apparatus for selecting and using dark images in dark fixed pattern noise cancellation processing in a CMOS sensor-based, digital imaging system based on current operating characteristics of the CMOS sensor comprising:

a cache of dark images, the cache comprising a data structure indexing the dark images, each entry in the data structure storing dark image reference data associated with one of the dark images, each dark image corresponding to a set of operating characteristics of the CMOS sensor;

means for obtaining current dark image reference data from at least one dark area in a current frame of a stream of frames captured by the digital imaging system, the at least one dark area being a portion of the CMOS sensor receiving no illumination and operating as a signature of the current operating characteristics of the CMOS sensor; and means for performing dark fixed pattern noise cancellation processing on the current frame using a selected dark image from the cache associated with an entry in the data structure when the current dark image reference data corresponds to the entry.

13. The apparatus of claim 12, further comprising means for enabling generation of a stream of frames.

14. The apparatus of claim 12, wherein the cache is stored on a host computer system and the obtaining means and the performing means are components of a CMOS sensor-based video camera coupled to the host computer system.

15. The apparatus of claim 14, further comprising a bi-directional interface coupling the video camera to the host computer system.

16. The apparatus of claim 15, wherein the bi-directional interface is a universal serial bus (USB) interface.

17. The apparatus of claim 15, wherein the video camera comprises a memory for storing a current dark image used in dark fixed pattern noise cancellation processing and the selected dark image is transferred from the cache to the memory.

18. The apparatus of claim 15, wherein the current dark image reference data is transferred from the obtaining means on the video camera to the host computer system.

19. The apparatus of claim 18, wherein the host computer system comprises means for comparing the current dark image reference data to entries in the data structure of dark image reference data in the cache.

20. The apparatus of claim 19, wherein the comparing means compares the current dark image reference data to entries in the data structure only when operating characteristics of the CMOS sensor have changed.

21. The apparatus of claim 19, wherein the comparing means compares the current dark image reference data to entries in the data structure only when the current dark image reference data is different than immediately preceding dark image reference data.

22. The apparatus of claim 21, wherein the difference between the current dark image reference data and the immediately preceding dark image reference data is greater than a threshold amount.

23. An apparatus for selecting and using dark images in dark fixed pattern noise cancellation processing in a CMOS sensor-based, digital imaging system based on current operating characteristics of the CMOS sensor comprising:

a CMOS sensor having at least one dark area, the at least one dark area being a portion of the CMOS sensor receiving no illumination and operating as a signature of the current operating characteristics of the CMOS sensor;

a cache of dark images, the cache comprising a data structure indexing the dark images, each entry in the data structure storing dark image reference data associated with one of the dark images, each dark image corresponding to a set of operating characteristics of the CMOS sensor;

a processing unit to obtain current dark image reference data from the at least one dark area in a current frame of a stream of frames captured by the digital imaging system;

a dark fixed pattern noise subtraction unit to perform dark fixed pattern noise cancellation processing on the current frame using a selected dark image from the cache associated with an entry in the data structure when the current dark image reference data corresponds to the entry.

24. The apparatus of claim 23, further comprising a memory for storing a current dark image used in dark fixed pattern noise cancellation processing and wherein the selected dark image is transferred from the cache to the memory.

25. The apparatus of claim 23, wherein the cache is stored on a host computer system and the processing unit and the dark fixed pattern noise subtraction unit are components of a CMOS sensor-based video camera coupled to the host computer system by a bi-directional interface.

26. The apparatus of claim 25, wherein the bi-directional interface is a universal serial bus (USB) interface.

27. A machine readable medium having stored therein a plurality of machine readable instructions designed to be executed by a processor, the machine readable instructions for providing a cache of dark images, the dark images being indexed by a data structure, each entry in the data structure storing dark image reference data associated with one of the dark images, each dark image corresponding to a set of operating characteristics of the CMOS sensor; obtaining current dark image reference data from at least one dark area in a current frame of a stream of frames generated by a CMOS sensor-based digital imaging system, the at least one dark area being a portion of the CMOS sensor receiving no illumination and operating as a signature of the current operating characteristics of the CMOS sensor; comparing the current dark image reference data to entries in the data structure of dark image reference data; and using a dark image from the cache associated with an entry in the data structure of dark image reference data to perform dark fixed pattern noise cancellation processing on the stream of frames when the current dark image reference data corresponds to the entry.

* * * * *